M. PRICE.
AUTOMOBILE WHEEL LOCATOR.
APPLICATION FILED FEB. 6, 1922.
1,434,148.
Patented Oct. 31, 1922.
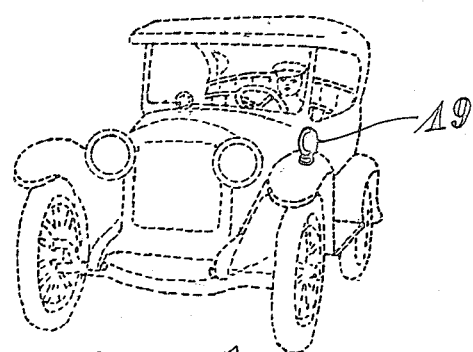
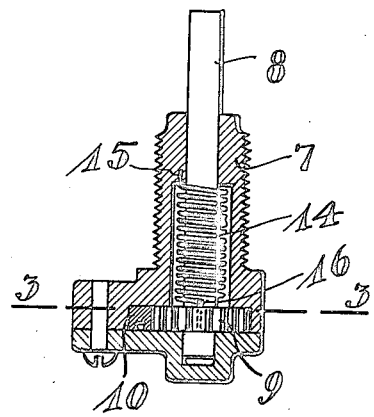
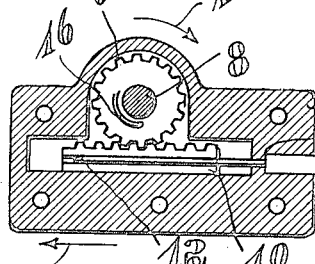
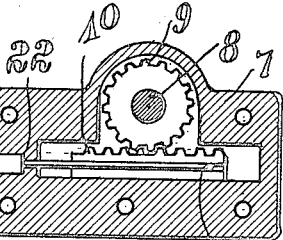
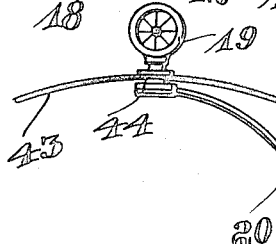
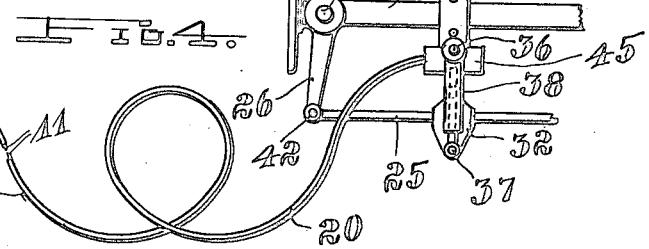
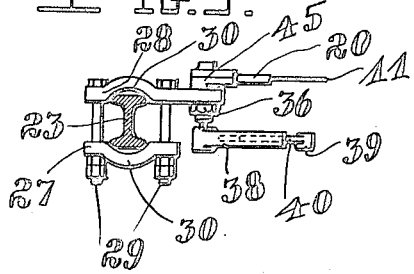
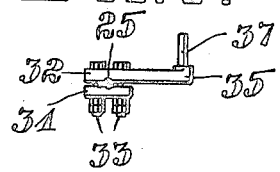
INVENTOR:
MORRIS PRICE,
BY: Otto H. Krueger
his Atty.

UNITED STATES PATENT OFFICE.

MORRIS PRICE, OF LOS ANGELES, CALIFORNIA.

AUTOMOBILE WHEEL LOCATOR.

Application filed February 6, 1922. Serial No. 534,630.

*To all whom it may concern:*

Be it known that I, MORRIS PRICE, a citizen of the United States, residing at Los Angeles, in the county of Los Angeles and State of California, have invented a new and useful Automobile Wheel Locator, of which the following is a specification.

This invention relates to devices indicating the position of the swinging or steering wheels of a vehicle, in automobiles normally the front wheels, so that the operator of the vehicle can ascertain from his seat in which direction the vehicle is headed.

One of the objects of this invention is to provide a device that causes a minimum amount of friction within the device by the actions of the springing interconnection of the body and the axle of the vehicle.

Another object is to provide a device that will easily yield without working under any lost motion.

Another object is to provide a device that can be rigidly attached to the axle and connecting rod of the axle, and of which the indicating member can be rigidly attached at a point in view of the operator without requiring any sliding parts to take up the motion between the axle and the body of the vehicle.

Another object is to provide a device which has a good appearance as far as in view.

Another object is to provide the indicating part or member of the device in form of a wheel, preferably on top of the wheel fender in view of the operator.

Other objects will appear from the following description and appended claims as well as from the accompanying drawing, in which—

Fig. 1 is a perspective outline in dotted lines of an automobile, illustrating the small indicator, in form of a wheel, on the top of the left hand front fender in view of the operator of the automobile.

Fig. 2 is a detail midsectional view of the operating gear of the device.

Fig. 3 is a cross section on line 3—3 of Fig. 2, illustrating the two co-acting gears, the gear to the left being preferably spring-controlled, and may be named the operated member, while the gear to the right may hereafter be called the operating member.

Fig. 4 is a somewhat diagrammatic illustration of the whole arrangement, to the left, a portion of an automobile fender being indicated with a side elevational view of the indicating portion of the device, and, to the right, a portion of the front axle with steering knuckle and connecting rod is illustrated in top plan view with the operating portion of the device in proper position, operating and operated portion or gearing being illustrated as connected by a tubing with the operating wire within.

Fig. 5 is a fragmentary side elevation of the connecting means for holding the operating gearing to the axle of an automobile.

Fig. 6 is a side elevation of the connecting means for engaging the operating gearing with the connecting rod of the steering wheels of an automobile.

Both the operating and the operated gears or gearings are preferably of uniform construction, consisting mainly of the housing 7, the stem 8, the gear pinion 9, and the gear rack 10, as illustrated in Fig. 2.

In Fig. 3, the working arrangement of the two gearings is illustrated, a wire 11 connects at one end 12 with the gear rack of the operated gearing, while the same wire 11 connects at its other end 13 with the gear rack of the operating gearing. A spring 14 is disposed in the operated gearing, engaging at one end with the housing 7, as indicated at 15, while engaging at its other end with the gear pinion 9, as indicated at 16, see Fig. 2. In the illustration in Fig. 3, in the gearing shown to the left, the spring-end-engagement at 16 with the gear pinion is indicated to make it clear that the pinion is permanently under the tension of the spring 14 to result in a turning of this gear pinion in the direction of the arrow 17, so as to cause a steady draw on the rack 10 in this gearing in the direction of the arrow 18. The stem 8 of this operated gearing normally carries the indicating member, which is preferably in form of a small wheel, as indicated at 19 in Figs. 1 and 4.

The operating gearing is preferably without spring, so that the tension of the spring 14 in the operated gearing acts also on the gearing in the operating gearing.

The operating gearing is normally engaged or connected with a part of the steering mechanism of a vehicle.

The thin wire or connecting member 11 between the operating and operated gearing is preferably encased in a light tubing 20. The ends 21 and 22 of the tubing shoulder within the housings of the operating and operated gearings, so that a pulling or drawing of the inclosed wire cannot affect the position of the gearing-housings on the tubing, since the tension on the wire is always in the same direction on account of the spring in the operated gearing. Providing only one spring, that is preferably in the operated gearing, assures also a positive indicating by the action of the operated gearing, avoiding differences in the movements that might otherwise be caused by lost motions.

The operating gearing is preferably attached to the front axle of automobiles, but may be attached to various other parts within the steering mechanism of the automobile without departing from the principle of this invention. In Fig. 4, a portion of a front axle is indicated at 23, a steering knuckle is indicated at 24, and a portion of a connecting rod is indicated at 25. The steering knuckle of an automobile is normally provided with a lever as indicated at 26, operative by the connecting rod 25.

A simple and preferable form of attaching clamp for the operating gearing on the axle is illustrated in Fig. 5. A lower bar 27 and an upper bar 28 are clamped to the axle by the bolts 29. To facilitate a centralizing of the clamping device in relation to the longitudinal axis of the axle, both bars 27 and 28 are preferably provided with a curved portion 30 to easily settle and locate in correct position and relation to the axle when applied in the manner illustrated. Another clamping device is illustrated in Fig. 6, for engagement with the connecting rod 25. The lower bar 31 and the upper bar 32 are connected and clamped together by the bolts 33. The upper bar 28 and the upper bar 32 are provided with extension ends 34 and 35, so that the distance from the center of the axle 23 to the center 36 of the attaching pin in the end 34 of the bar 28 is equal to the distance from the center of the connecting rod 25 to the center 37 of the attaching pin in the end 35 of the bar 32. The screw end of the housing 7 of the gearing is inserted through the end 34 of the bar 28 in the attaching device in Fig. 5, the stem 8 projecting downwardly to support an operating lever, as indicated at 38, the free end 39 of the lever 38 to connect to the pin on the end 35 of the bar 32. The illustrations of the attaching members in Figs. 5 and 6 tend to indicate that the connecting rod must be lower than the center of the axle, but it will easily be understood that the screw end of the housing 7 can be inserted through the end 34 of the bar 28 so that the stem 8 projects upwardly to bring the lever 38 to a higher position than illustrated in Fig. 5.

The lever 26 varies on different automobiles, for which reason it is desirable that the lever 38 can be adjusted to take care of such variations in the lever 26. A preferable form of adjusting means within the lever 38 is a press-fit telescopic engagement, as indicated at 40 in Fig. 5.

The distance between the pivot axis at 41, in Fig. 4, and the pivot point at 42 must be equal to the distance between the pivot point at 37 and the pivot point 36, see Fig. 4, so that the operating lever on the steering knuckle turns and swings in the same size radius as the lever 38.

Having a spring in the operated gearing only, considering the illustration in Fig. 4, it does not matter how long the operating member or wire is as long as the inclosing casing supports and guides the operating member, the operating member or wire 11 always stays on the narrower or shorter side of the casing 20. The casing with the inclosed operating member can be placed in a manner and at such a length between a part of the steering mechanism of an automobile and a suitable point or part in view of the operator to which the indicating member of the device can be attached.

In Figs. 1 and 4, the indicating member of the device is illustrated as attached and supported by the fender of an automobile, in Fig. 4 a portion of the fender being indicated at 43 with the complete operated portion of the device below the fender as indicated at 44. The complete operating portion of the device is indicated at 45, actuated by the lever 38. The operating member or wire 11 connects the operated portion 44 of the device with the operating portion 45 of the device, the wire 11 being within the casing 20.

In the neutral position of the steering mechanism, being the position indicated by the illustration in Fig. 4, with reference to the steering knuckle 24 and the levers 26 and 38, the operated member has been put under the tension of the spring 14 so that its gear rack 10 is practically in the middle of its working path within the housing 7, the spring acting as described above in the direction of the arrow 17, controlled by the wire 11 by means of the operating gearing, see Fig. 3. On operating the steering mechanism to one side, the spring is simply allowed to move the indicator in one direction, while a moving of the steering mechanism in the opposite direction causes a pulling of the wire 11 against the spring 14 in the operated gearing to move the indicator in the opposite direction.

Having thus described my invention, I claim:

1. In a wheel indicator, in combination with the steering mechanism of a vehicle, an operated gearing having a wheel-shaped indicator disposed in a normally vertical plane so as to swing similar to the movement of the wheel of which it is to indicate the position in relation to the said steering mechanism, and operating gearing, and spring-controlled connection means between the operated and operating gearing adapted to maintain the operated indicator-carrying gearing in proper position yieldingly against the movements of the operating gearing.

2. In a wheel indicator, in combination with the steering knuckle of the front wheel with axle and connecting rod, an operating lever having means to pivotally engage the front axle and the connecting rod of a length equal to the length of the knuckle-lever adapted to register similar movements as the steering knuckle, an operating gearing operative by the said lever, and an operated gearing having indicating means operative by the said operating gearing.

3. In a wheel indicator, a combination with the steering knuckle of the front wheel with the axle and the connecting rod; an operating lever having means to pivotally engage the front axle and the connecting rod made of sections, the sections of the lever having a press-fit telescopic interconnection to allow an adjustment of the lever to a length equal to the lever of the steering knuckle, an operating gearing operative by the said lever, and an operated gearing having indicating means operative by the said operating gearing.

4. In a wheel indicator, in combination with the steering knuckle of the front wheel, the front axle, and the connecting rod; a clamping connection consisting of one member to engage with the front axle and having a pivot; a second member of the clamping connection having means to engage with the said connecting rod of the steering knuckle and having a pivot and a lever member engaged with the pivots for a parallel action with the lever on the said knuckle, an operating gearing operative by the said lever, and an operated gearing having indicating means operative by the said operating gearing.

5. In a wheel indicator, in combination with the fender, front-axle, steering knuckle, and connecting rod of an automobile; a gearing having a stem attached to the underside of the said fender so that the stem projects through the fender to a point above the fender; a wheel-shaped indicator disposed on the stem of the gearing so as to become located nearly above the front wheel of the automobile to obviously suggest its purpose; a lever pivotally supported by the front axle and pivotally engaged to the connecting rod to follow the movements of the lever on the steering knuckle; an operating gearing firmly mounted on the front axle in operative connection with the said lever; a guide-tube disposed between the gearing on the fender and the gearing on the front axle; and a wire disposed in the tube operatively connecting the two gearings.

6. In a wheel indicator, in combination with the steering mechanism of a vehicle, an operating gearing in operative connection with the steering mechanism of a vehicle, and gearing in operative connection with the said operating gearing and consisting of a housing, a stem turnably disposed in the housing projecting out of the housing adapted to carry a wheel indicating member, a gear-pinion mounted on the stem, a gear rack slidably mounted in the housing in operative engagement with the gear pinion having means allowing a connection of operating means.

7. In a wheel indicator, in combination with the steering mechanism of a vehicle, and an operating gearing in operative connection with the steering mechanism; an operated gearing in operative connection with the said operating gearing and consisting of a housing, a stem turnably disposed in the housing projecting out of the housing adapted to carry a wheel-indicating member, a gear-pinion mounted on the stem, a gear rack slidably disposed in the housing in operative engagement with the gear pinion, the housing having a passage to the outside in alignment with the movement of the gear-rack in the housing, and the gear-rack having provisions to allow an engagement of connecting means so that the connecting means can pass through the housing by way of the said passage.

8. In a wheel indicator, in combination with the steering mechanism of a vehicle and an operating gearing in operative connection with the steering mechanism; an operated gearing in operative connection with the said operating gearing and consisting of a housing having means to allow an attaching of the housing to suitable places, a stem turnably disposed in the housing and projecting out of the housing to form a support for a wheel indicating member, a gear-pinion firmly mounted on the stem, a gear-rack slidably disposed in the housing in operative engagement with the gear-pinion, the housing having a passage to the outside in alignment with the movement of the gear-rack in the housing, a connecting means firmly engaging with the gear-rack and passing through the passage in the housing, and a spring disposed within the housing at a point between the gear rack and the housing.

In testimony that I claim the foregoing as my invention I have signed my name in the presence of two subscribing witnesses.

MORRIS PRICE.

Witnesses:
 O. H. KRUEGER,
 JESSIE A. MANOCK.